US011493768B2

(12) United States Patent
Cai et al.

(10) Patent No.: US 11,493,768 B2
(45) Date of Patent: Nov. 8, 2022

(54) AUGMENTED/VIRTUAL REALITY NEAR EYE DISPLAY WITH EDGE IMAGING SPECTACLE LENS

(71) Applicant: Ostendo Technologies, Inc., Carlsbad, CA (US)

(72) Inventors: Jingbo Cai, Carlsbad, CA (US); Hussein S. El-Ghoroury, Carlsbad, CA (US); Martin Maiers, Fallbrook, CA (US)

(73) Assignee: Ostendo Technologies, Inc., Carlsbad, CA (US)

(*) Notice: Subject to any disclaimer, the term of this patent is extended or adjusted under 35 U.S.C. 154(b) by 123 days.

(21) Appl. No.: 16/512,029

(22) Filed: Jul. 15, 2019

(65) Prior Publication Data
US 2020/0026087 A1 Jan. 23, 2020

Related U.S. Application Data

(60) Provisional application No. 62/699,436, filed on Jul. 17, 2018.

(51) Int. Cl.
G02B 27/01 (2006.01)
G02B 27/10 (2006.01)
(Continued)

(52) U.S. Cl.
CPC ..... G02B 27/0176 (2013.01); G02B 27/0075 (2013.01); G02B 27/10 (2013.01); G02B 27/283 (2013.01); G02B 2027/0178 (2013.01)

(58) Field of Classification Search
CPC .............. G02B 27/0176; G02B 27/0075; G02B 27/10; G02B 27/283; G02B 2027/0178
See application file for complete search history.

(56) References Cited

U.S. PATENT DOCUMENTS 5,696,521 A * 12/1997 Robinson ............. G02B 27/017 345/8
5,777,795 A * 7/1998 Colucci ................ G02B 27/017 348/E9.024

(Continued)

OTHER PUBLICATIONS

International Search Report and Written Opinion for International Patent Application No. PCT/US2019/041958, dated Dec. 2, 2019, 10 pages.

Primary Examiner — Ricardo Osorio
(74) Attorney, Agent, or Firm — Greg Caldwell, Esq.; W. Eric Boyd, Esq.

(57) ABSTRACT

A near eye display system having an image display panel, a prism assembly comprising a first and second element and a structure such as a eye wear glasses frame. The front and rear surfaces of the first and second elements are aligned and bonded to form the prism assembly. A partially-reflective coating is applied to the interface of the first and second elements to define a beam-splitter interface. The image display panel is disposed near an upper optical region such as a refracting surface of the first element. The lower edge of the second element opposite the beam-splitter interface is a coated reflective surface mirror. The display panel, the optical region and the optically reflective surface are configured to provide compactness and to avoid the break of symmetry. The system accommodates large inter pupil distance (IPD) variation and left/right eye scanning motion.

21 Claims, 18 Drawing Sheets

(51) Int. Cl.
G02B 27/28 (2006.01)
G02B 27/00 (2006.01)

(56) References Cited

U.S. PATENT DOCUMENTS

| | | | | |
|---|---|---|---|---|
| 5,886,822 | A * | 3/1999 | Spitzer | G02B 27/143 |
| | | | | 359/630 |
| 6,147,807 | A * | 11/2000 | Droessler | G02B 27/0172 |
| | | | | 359/633 |
| 6,353,503 | B1 * | 3/2002 | Spitzer | G02B 27/017 |
| | | | | 359/630 |
| 6,710,902 | B2 * | 3/2004 | Takeyama | G02B 5/32 |
| | | | | 345/8 |
| 8,508,851 | B2 * | 8/2013 | Miao | G02B 27/28 |
| | | | | 359/618 |
| 9,134,535 | B2 * | 9/2015 | Dobschal | G02B 27/0172 |
| 9,239,453 | B2 * | 1/2016 | Cheng | G02B 17/006 |
| 2006/0119951 | A1 * | 6/2006 | McGuire | G02B 27/1026 |
| | | | | 359/630 |
| 2007/0177275 | A1 * | 8/2007 | McGuire | G02B 27/0172 |
| | | | | 359/630 |
| 2014/0232651 | A1 * | 8/2014 | Kress | G02B 27/017 |
| | | | | 359/630 |
| 2014/0347361 | A1 * | 11/2014 | Alpaslan | H04N 13/307 |
| | | | | 345/426 |
| 2016/0077338 | A1 * | 3/2016 | Robbins | G09G 3/002 |
| | | | | 345/8 |
| 2017/0184776 | A1 * | 6/2017 | El-Ghoroury | G02B 30/50 |
| 2017/0255013 | A1 * | 9/2017 | Tam | G03H 1/2286 |
| 2017/0285347 | A1 * | 10/2017 | Cai | G02B 27/0172 |

* cited by examiner

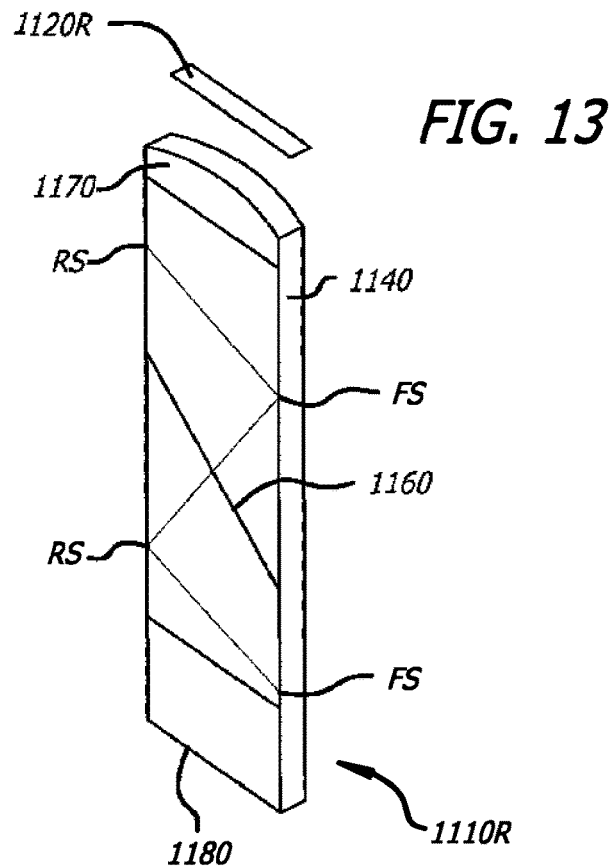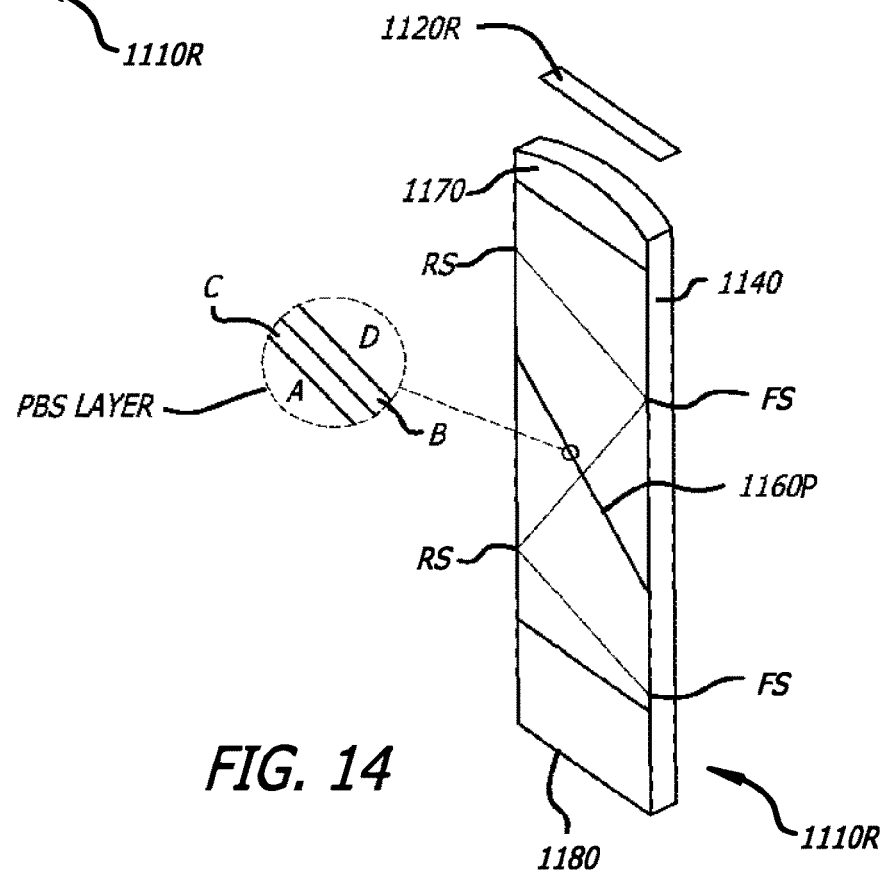
FIG. 13
FIG. 14

V-FOV = $\theta_1 + \theta_2 + \theta_3$
3 - VERTICAL SECTIONS TEMPORALLY MULTIPLEXED

DISPLAY FRAME TIME PERIOD

AUGMENTED/VIRTUAL REALITY NEAR EYE DISPLAY WITH EDGE IMAGING SPECTACLE LENS

CROSS REFERENCE TO RELATED APPLICATIONS

This application claims the benefit of U.S. Provisional Application No. 62/699,436 filed on Jul. 17, 2018, the disclosure of which is incorporated herein by reference.

TECHNICAL FIELD

The present invention relates to near-eye display systems with a particular emphasis on optical see-through (OST) near-eye augmented reality (AR) display systems.

BACKGROUND

Progress in the miniaturization and capability of image display panels, sensors and processors, combined with the wide accessibility of high speed internet and cloud computing via wireless communication makes compact and wearable near-eye display systems not only possible but highly desirable.

Such near-eye display systems are commonly categorized as either optical see-through (OST) augmented reality (AR), wherein virtual images are overlaid onto the user's real-world view in real time to enhance vision, or camera (or video) see-through (CST) virtual reality (VR), wherein the user's entire view is artificially, i.e., virtually created. OST AR is often preferred over CST VR because of its mobility aspects.

A challenge in the design of OST AR is to make the system truly wearable. For this purpose, the system must present high quality virtual images, be comfortable to wear, volumetrically compact and not make the wearer socially awkward in appearance. Further, it must not impair the user's perception of real-world environments. All of these requirements must be met under the constraints of low cost in mass production.

FIG. 1 shows an optical system of a prior art OST AR system as disclosed in U.S. Pat. No. 5,696,521. Despite the light path bend at the beam splitter cube, the optical system maintains its axial rotational symmetry and has a relatively simple structure. The image quality of this system is good and its fabrication is easy. However, the bulky cube beam splitter obstructs the eye's view of the real world environment in addition to being uncomfortable to wear since the beam splitting cube formed by 84 and 82 is bulky.

FIG. 2 shows a further prior art OST AR system as disclosed in U.S. Pat. No. 8,508,851. A polarization beam splitting mirror 920 and quarter wave plate 930 are used to fold the imaging light path into the line of vision. Most of the optical components of this display system are integrated into a single entity 300 which also functions as a cube-like spectacle lens disposed in front of the eye along the vision path 910. However, the disclosed system suffers from the same bulkiness issue as the OST AR system disclosed in U.S. Pat. No. 5,696,521. Also the embedded components 930 and 900 are disposed close to the beam splitting surface 920 and can interfere with the real-world perception when using the system.

FIG. 3 shows yet a further prior art OST AR system as disclosed in U.S. Pat. No. 8,508,851. The virtual image generation optics units 302 and 304 are generally the same as the system disclosed in U.S. Pat. No. 5,886,822. To reduce bulkiness and weight, 302 or 304 are kept just large enough vertically to pass the imaging light path. However, the real-world view path is greatly constrained by this device's limited vertical dimension. The mounting of 302 and 304 onto a regular eyewear frame as shown in the FIG. 3 gives its wearer an undesirable awkward appearance.

FIG. 4 shows yet a further prior art OST AR system as disclosed in U.S. Pat. No. 6,353,503. The imaging path is bent to approximately follow the contour of the viewer's face by means of a tilted mirror 25 embedded within a spectacle lens 15. To balance the optical aberration introduced by the tilted mirror 25, the image relay section 52 is tilted and/or decentered as well. The image quality of such a system is limited by the break of symmetry. The fabrication tolerance of this type of OST AR system is also very tight. Further, this device's horizontal eye box dimension is directly proportional to the spectacle lens thickness in which element 25 is embedded. For a reasonably thin spectacle lens, the horizontal eye box in the disclosed device is quite small, thus making the system uncomfortable to wear. Also the location, orientation and bulkiness of image relay optics section 52 and image display panel 50 greatly detract from the aesthetic appearance of this OST AR system.

FIG. 5 shows yet a further prior art OST AR system as disclosed in U.S. Pat. No. 6,710,902. The information content at display panel 5 is relayed to an intermediate image position inside the curved waveguide 3 which functions as a spectacle lens in front of the eye. To compensate for the optical aberrations arising in the curved waveguide, a group of free-formed and/or decentered lenses 4 and a first reflective volume HOE 32 is employed in the image relay section. The intermediate image is then collimated and directed to eye pupil 1 by a second reflective volume HOE 31 within waveguide 3. However, the thickness of waveguide 3 limits the size of the horizontal eye box dimension to a relatively small geometry. This makes the eye alignment with the display system critical and the near-eye display less comfortable to use. The fabrication of such a system is also difficult. Further, the position of 4 and 5 at the temple sides makes their packaging bulky and becomes a challenge for an attractive near-eye display system.

FIG. 6 shows yet a further prior art OST AR system as disclosed in U.S. Pat. No. 9,134,535. Information light from display panel 10 is collimated by lens 12 and is then coupled into the curved waveguide by a first reflective Fresnel feature at entry region 15. The curved front and back of the waveguide is serrated with a second Fresnel feature whose working facets have heights from 20 um to 300 um and are normal to the optical axis OA in FIG. 6. The information light is guided to exit region 16 through TIR reflections on the waveguide parallel Fresnel facets. The information light is then coupled out of the waveguide by a third reflective Fresnel feature at the exit region 16 and is directed along the vision line of the eye box.

The use of Fresnel features in this disclosure has the advantage of avoiding aberrations which would be produced at a smooth curved waveguide surface and, as a result, the imaging optics in front of the waveguide are greatly simplified. However, the Fresnel features can introduce artifacts by causing a scattering of real-world view imaging light transmission through the waveguide. Further, the parallel condition among facets of the second Fresnel feature must be held quite close to avoid image blur that is introduced by multiple TIR reflections on these relatively tilted facets and this increases fabrication challenges. Since the optical path from lens 12 to the eye box is quite large, the diameter of lens 12 increases as the field of view of the system increases. This, again makes the near-eye display eyewear bulky and less appealing in appearance.

FIG. 7 shows yet a further prior art OST AR system as disclosed in U.S. Pat. No. 6,147,807. Information light from display panel 6 passes through field lenses 8 and 9 before it enters prism 4 through surface 10. There are diffractive optical elements or features (DOE) on surface 10 for the correction of chromatic and astigmatic aberrations. Once entering prism 4, the information light is TIR reflected at surface 12 toward surface 14 which is an aspherical toroid. Surface 14 images the incident light from surface 12 and reflects it back through surface 12 to reach eye pupil at 20. The TIR reflection at surface 12 is good for system efficiency but to meet the TIR angle constraint, surface 12 and 14 must be tilted in a very specific way. As a result, aberrations from surface 14 are increased in this process. To balance oblique aberrations from surface 14, complicated surface contours at surface 14 such as a DOE on surface 10 and a pair of decentered lenses 8 and 9 are employed. All of these increase the optical element's volumetric aspects and fabrication costs coupled with the fact that achieving correct optical alignment is a challenge. For a clear transmission of the real-world view, a matching prism 16 is paired with prism 4. However, the addition of prism 16 makes the near-eye display system even more bulky. The tilt of surface 12 also makes the near-eye device tilted at an awkward angle on a user's face.

FIG. 8 shows yet a further prior art OST AR system as disclosed in U.S. Pat. No. 9,239,453. Information light from display panel 730 refracts through the first free form surface before it is TIR reflected off the second free form surface 710 toward the third free form surface which is coated as a half mirror. This half mirror surface is provided with a high optical power and performs most of the imaging tasks and couples the information light out of the first prism toward the eye pupil through a transmission at the second free form surface 710.

For a clear transmission of the real-world view, a second matching prism with a free form surface 720 is provided to offset the undesired optical effects introduced by the first prism. In contrast to the field lens architecture disclosed in U.S. Pat. No. 6,147,807, this system corrects the field dependent aberration using free form surfaces. The TIR reflection at surface 710 ensures high efficiency of the system but the system must be tilted in a particular way to meet the TIR angle condition. As a result, this near-eye device is tilted at an awkward angle on a user's face. The matching prism also makes the system bulkier. The employment of free-form surfaces also increases the fabrication cost of his device.

FIG. 9 shows yet a further prior art OST AR system as disclosed in U.S. Patent Application Pub. No. 2016/0077338. A multilayer waveguide component 123 is disposed in front of eye 140 as a transmission spectacle lens. The projection unit 120a collimates information light from the imager 230 pixels 231. The information light is coupled into various waveguide layers of component 123 based on its wavelength band via input diffractive gratings disposed at the surface of each waveguide layer. The information light is guided in the waveguides by TIR reflection and is coupled out toward the eye at 140 via output diffractive gratings disposed at the surface of each waveguide layer. Due to the fact the output gratings cover a substantial area of the waveguide component 123, the information light interacts with these gratings a large number of times to increase the eye box first dimension along the output grating direction. To expand the eye box second dimension normal to the first eye box dimension, a folding grating zone is incorporated in the system.

The large eye box in addition to the thin spectacle-lens-like feature of the component 123 is desirable. However, there are a number of issues that arise in the use of such diffractive waveguide-based OST AR systems. Firstly, input diffractive gratings cannot support high efficiency over a wide wavelength band for full color imaging and large incident angles as is necessary for a quality user experience. Multiple-layer waveguides within each layer that are matched to different wavelength bands must be used. This increases the thickness of the waveguide plate and the fabrication cost of such systems. Secondly, the size of the input diffractive grating zone is minimized to control the volume of projection unit 120a and the thickness of waveguide plate 123. Thus the F/# of the projection unit is high and its optical efficiency is low. The efficiency is further reduced by the losses incurred due to folding the projection unit into a smaller volume.

Thirdly, the output grating zone and the folding grating zone which cover a large area of 123 and interact with the information light a large number of times, must be designed with a low efficiency to ensure eye box uniformity. Thus, the increase in eye box size is achieved at the expense of low waveguide throughput efficiency. When combined with the low throughput efficiency of the projection unit, the disclosed OST AR system's efficiency is even lower.

Fourthly, input and output diffractive gratings have many wavelength dispersions which introduce image blur if not matched perfectly. This increases fabrication costs and environmental sensitivity.

Lastly, the projection unit of this prior art device greatly increases system volumetric aspects of the OST AR and detracts from its aesthetics.

In addition to compactness, the field of view (FOV) is another important specification for an OST AR system. It is obvious that any effort to increase the FOV without a reduction of eye box size or system throughput efficiency leads to growth of the system's volumetric aspects and its optical complexity. Viable methods to increase the FOV at the expense of system throughput efficiency may include the use of a time multiplexing FOV expansion method or beam splitting eye box expansion method or by both.

FIG. 10 shows a prior art OST AR display system as disclosed in U.S. Patent Application Pub. No. 2014/0232651. The light from display module 505 transmits through three switchable mirrors 531, 532 and 533, only one of which is active at any instant. It is assumed that the inactive switchable mirrors are highly transmissive while the active one is partially reflective. The end reflector 583 collimates the information light which reverses its propagation direction upon reflection and the information light is then redirected toward eye region 160 by the active switchable mirror. The three switchable mirrors work in a time multiplexed way to expand the FOV horizontally. Since the three mirrors have different distances to the eye and their viewing angles relative to the eye box change, their field vignetting effects are hence different with the switchable mirror 533 having the largest vignetting. This is only be worsened as the horizontal FOV which each switchable mirror must cover increases. Unless diffraction propagation of light occurs, the three parallel switchable mirrors as shown in the figures cannot achieve FOV tiling because the ray path shown does not follow the reflection law.

Single diffraction gratings suffer from very large chromatic aberrations if not balanced by a compensating grating somewhere in the system. Further, if not balanced by a compensating grating, a single diffraction grating introduces significant angular distortion due to non-linearity in grating reflection such as a conical diffraction in a grating. Also the incident angle at switchable mirror 533 of the rays reflected back from the end reflector 583 is too high to ensure good performance of either the switchable mirror or the switchable grating. Lastly, for a given FOV and eye box width, the light relay 565 requires a thickness larger than a certain value to avoid reflection ghosting of the display module generated by the front and back eye-facing surfaces. As the light relay 565 becomes thicker, the widths of the switchable mirrors also grow. This makes fabrication more challenging.

Lastly, the time multiplexing of the multiple segments of the FOV of the above OST AR system require an increase both in brightness and modulation rate that are proportional to the number of time multiplexed FOV segments; otherwise the OST AR display system suffers from multiplexing artifacts and its brightness will be low. The lower system throughput efficiency must be compensated by a brighter and faster modulation rate display panel. One example of such high brightness and fast modulation rate display panel is the micro-LED based display technology (see U.S. Pat. Nos. 7,623,560, 7,767,479, 7,829,902, 8,049,231, 8,243,770, 8,567,960, 8,098,265 and U.S. Patent Application Pub. No. 2018/0156965) incorporated in the waveguide based OST AR display system be described below.

A significant technical hurdle to the miniaturization of near-eye display systems including OST AR systems is the availability of high brightness and compact display panels. Common prior art display panel technologies include Digital Micro-mirror Display (DMD), Liquid Crystal Display (LCD), Liquid Crystal on Silicon (LCOS) and Organic Light Emitting Diode (OLED). Systems such as DMD and LCOS require an accompanying illumination optical system which adds bulkiness to the overall near-eye display system. LCD technology has associated low brightness and low resolution. OLED technology is more compact than DMD and LCOS and has better resolution than LCD but does not yet achieve sufficient brightness to overcome the high brightness of an ambient sunlit scene expected to be encountered in OST AR displays. Therefore OLED is a promising display panel format for near-eye displays, but OLED still needs to further improve its brightness and durability.

A new class of emissive micro-scale pixel array imager devices has recently been introduced as disclosed in U.S. Pat. Nos. 7,623,560, 7,767,479, 7,829,902, 8,049,231, 8,243,770, 8,567,960, 8,098,265 and U.S. Patent Application Pub. No. 2018/0156965, the entirety of each of which are fully incorporated herein by reference. The disclosed light emitting structures and devices are collectively referred to herein as a Quantum Photonic Imager display or "QPI®", a registered trademark of Applicant Ostendo Technologies, Inc. These disclosed devices desirably feature high brightness, very fast multi-color light intensity and spatial modulation capabilities, all in a very small single device size that includes all necessary image processing drive circuitry. The solid state light (SSL) emitting pixels of such a device may be either a light emitting diode (LED) or laser diode (LD), or both, whose on-off state is controlled by the drive circuitry contained within a CMOS chip (or device) upon which the emissive micro-scale pixel array of the imager is bonded. The size of the pixels comprising the disclosed emissive arrays of such imager devices is typically in the range of approximately 5-20 microns with a typical emissive surface area of the device being in the range of approximately 15-150 square millimeters. The pixels within the above emissive micro-scale pixel array devices are individually addressable spatially, chromatically and temporally, typically through the drive circuitry of its CMOS chip. The brightness of the light generated by such imager devices can reach multiple 100,000 cd/m2 at reasonably low power consumption. The QPI also features multi-color emission from a common pixel aperture plus pixel-level optical capabilities that enable direct collimation and directional modulation of the light emitted from each individual pixel comprising its multi-color emissive micro-pixel array. These unique features of the QPI are an ideal match for optical waveguide-based OST AR displays since these features contribute directly to reducing the system volumetric aspects, increasing its brightness and improving its optical performance and enable approaches such as time multiplexing to increase the OST AR display FOV while maintaining volumetric compactness.

The Quantum Photonic Imager (QPI) (see U.S. Pat. Nos. 7,623,560, 7,767,479, 7,829,902, 8,049,231, 8,243,770, 8,567,960, 8,098,265 and U.S. Patent Application Pub. No. 2018/0156965), referred to in the exemplary embodiments described below is well-suited for use in the wearable near-eye display systems invention herein. However it is to be understood that the QPI device is merely an example of the types of emissive micro-pixel devices that may be used in the present invention. Thus in the description to follow, references to a QPI device or simply "imager" are to be understood to be for purposes of specificity in the embodiments disclosed, and not for any limitation of the present invention.

BRIEF DESCRIPTION OF THE DRAWINGS

The invention will be understood more fully from the following Detailed Description taken in conjunction with the accompanying drawings in which:

FIG. 13 is a ray path for a non-polarized near eye display system of the present invention.

FIG. 14 is a ray path for a polarized near eye display system of the present invention.

DETAILED DESCRIPTION

Figure 1:
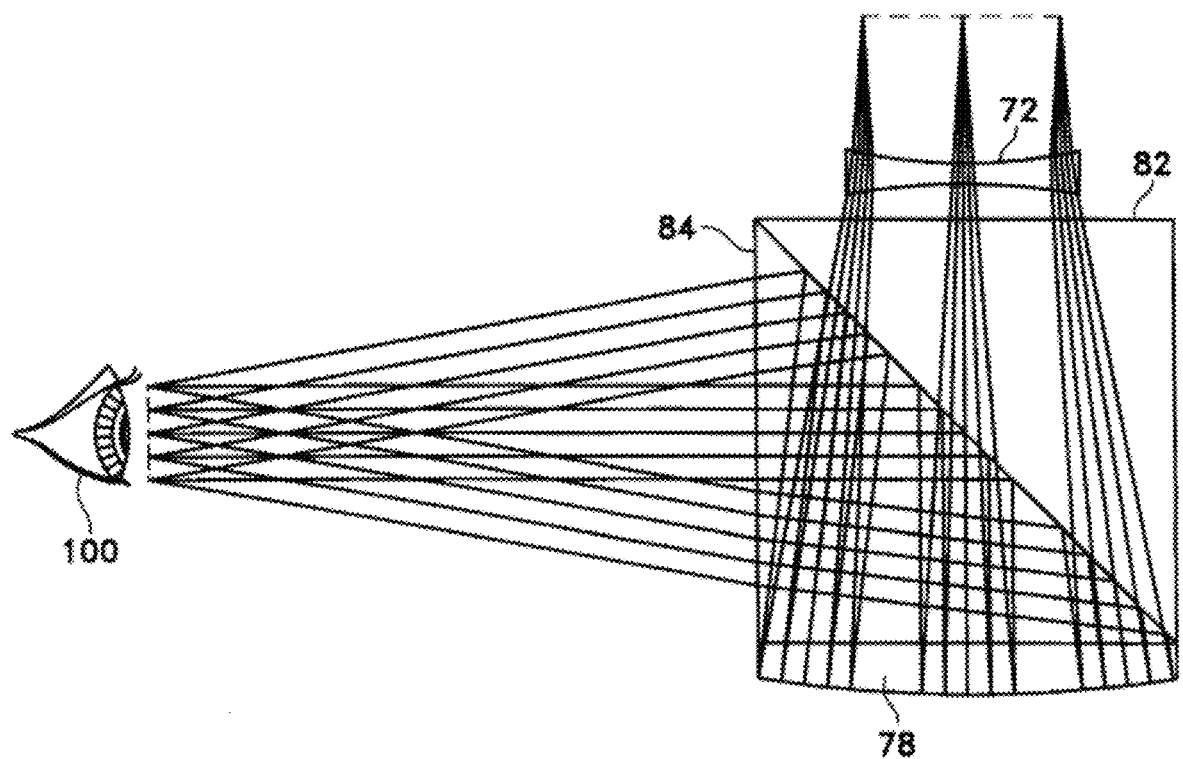
FIG. 1 is a prior art OST see-through near-eye display system.
Figure 2:
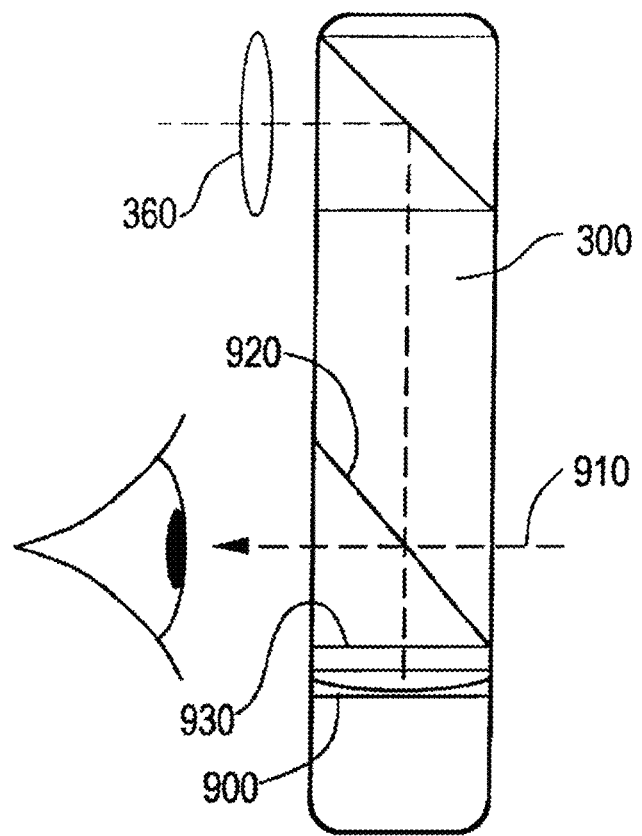
FIG. 2 is a further prior art see-through near-eye display system.
Figure 3:
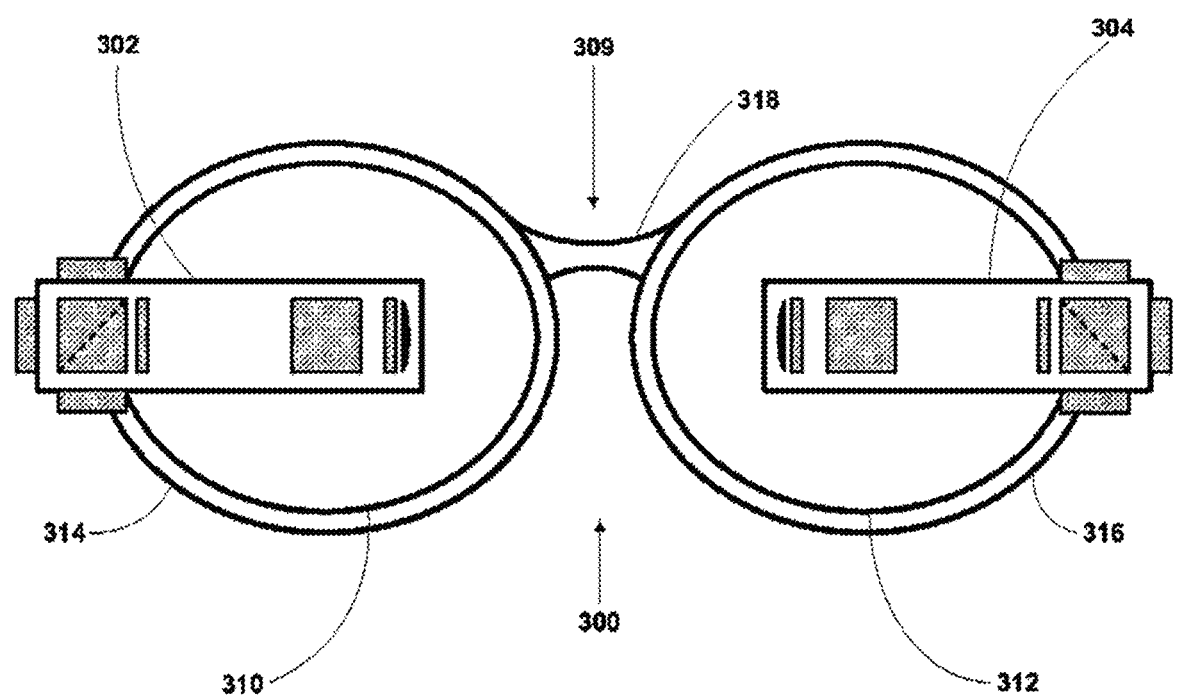
FIG. 3 is a yet further prior art see-through near-eye display system.
Figure 4:
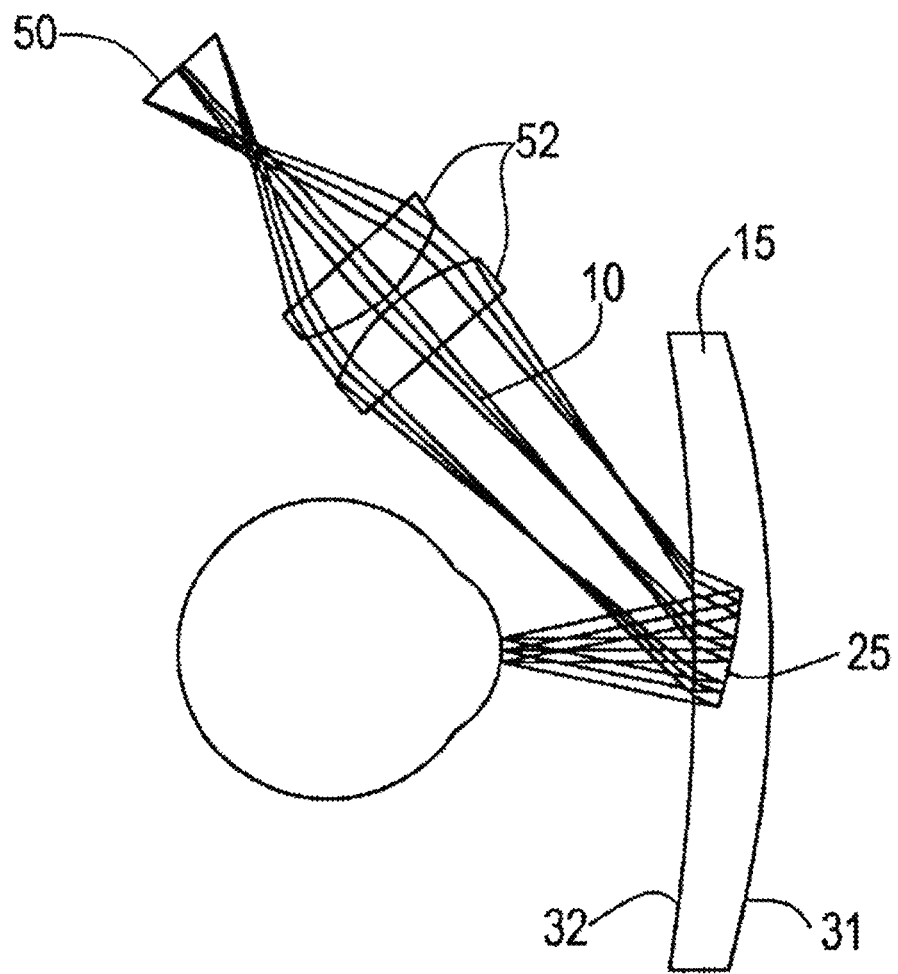
FIG. 4 is a yet further prior art see-through near-eye display system.
Figure 5:
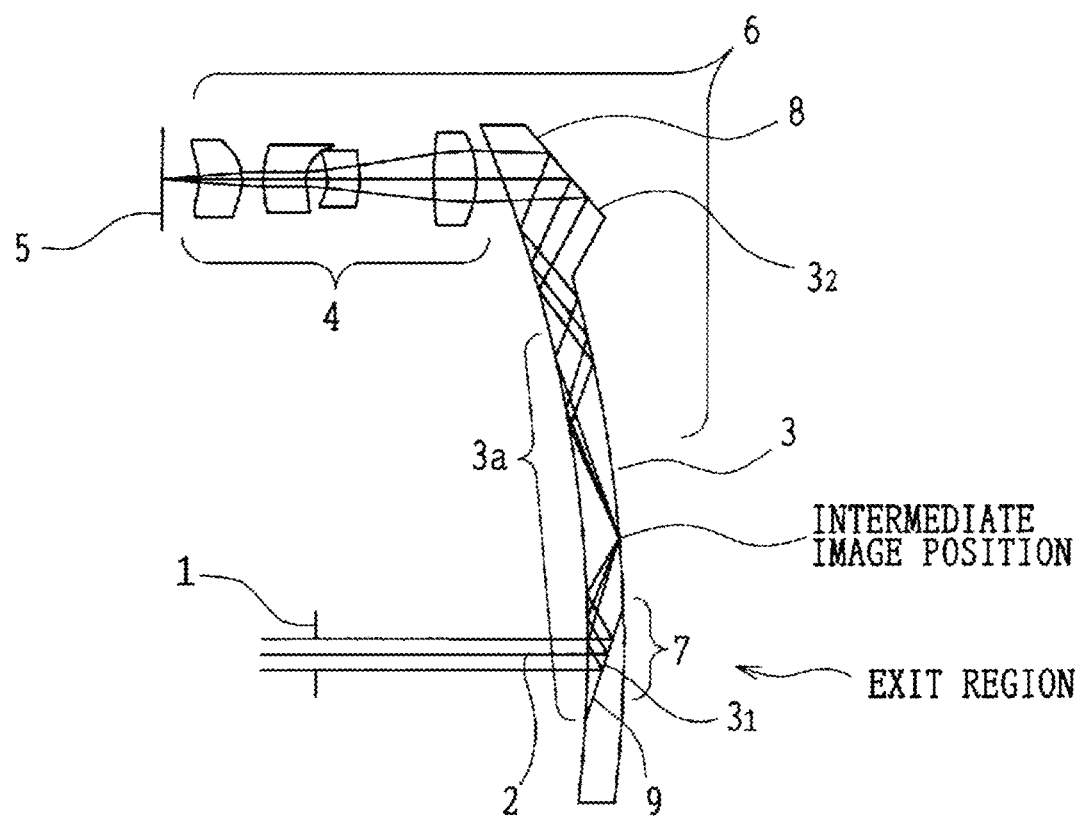
FIG. 5 is a yet further prior art see-through near-eye display system.
Figure 6:
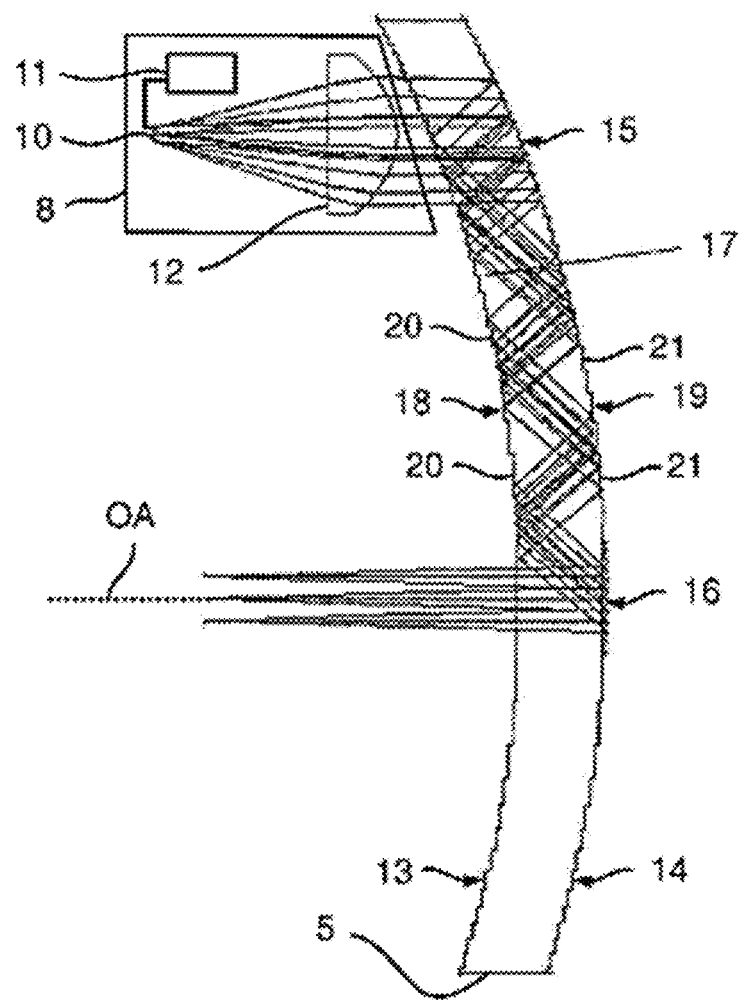
FIG. 6 is a yet further prior art see-through near-eye display system.
Figure 7:
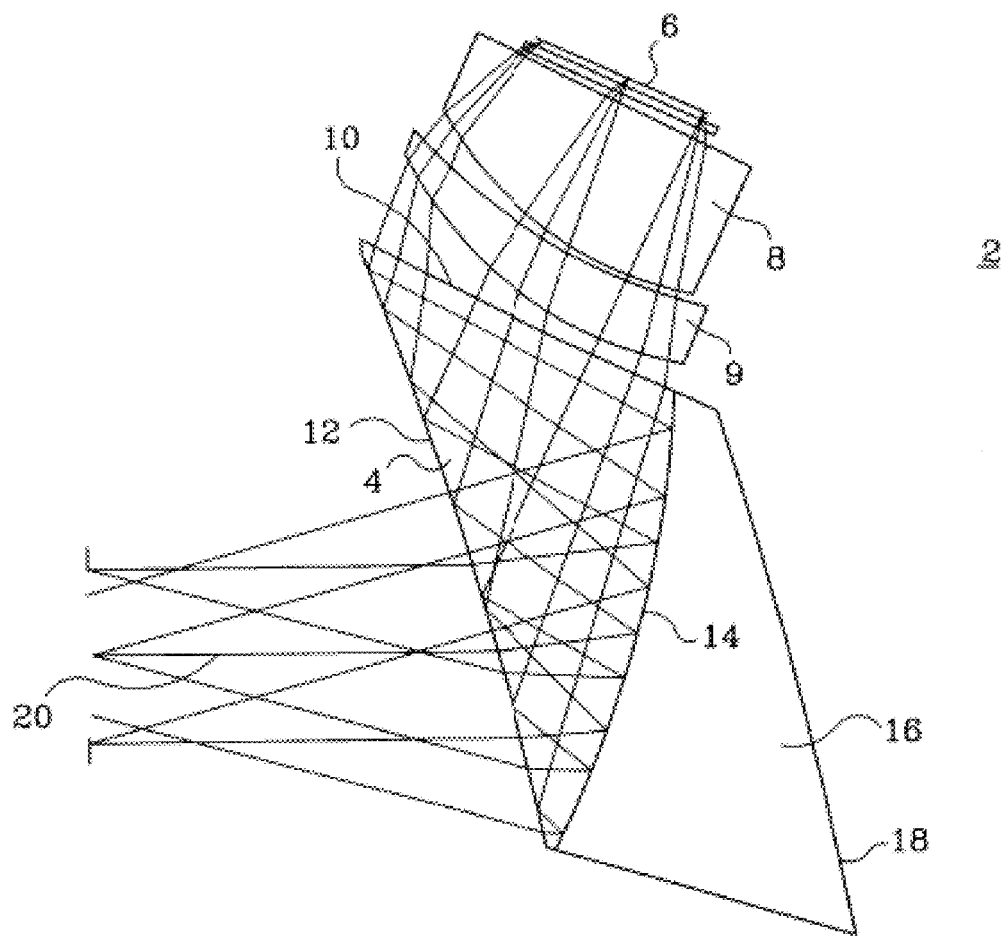
FIG. 7 is a yet further prior art see-through near-eye display system.
Figure 8:
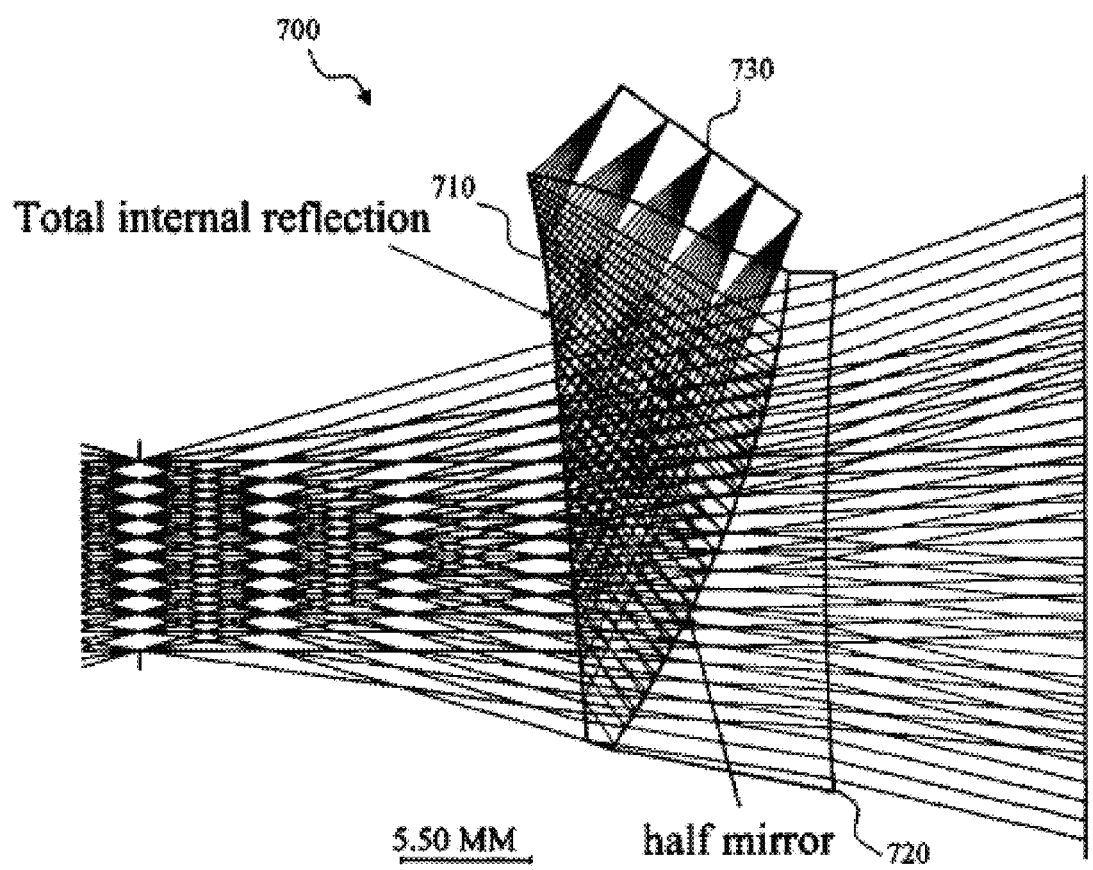
FIG. 8 is a yet further prior art see-through near-eye display system.
Figure 9:
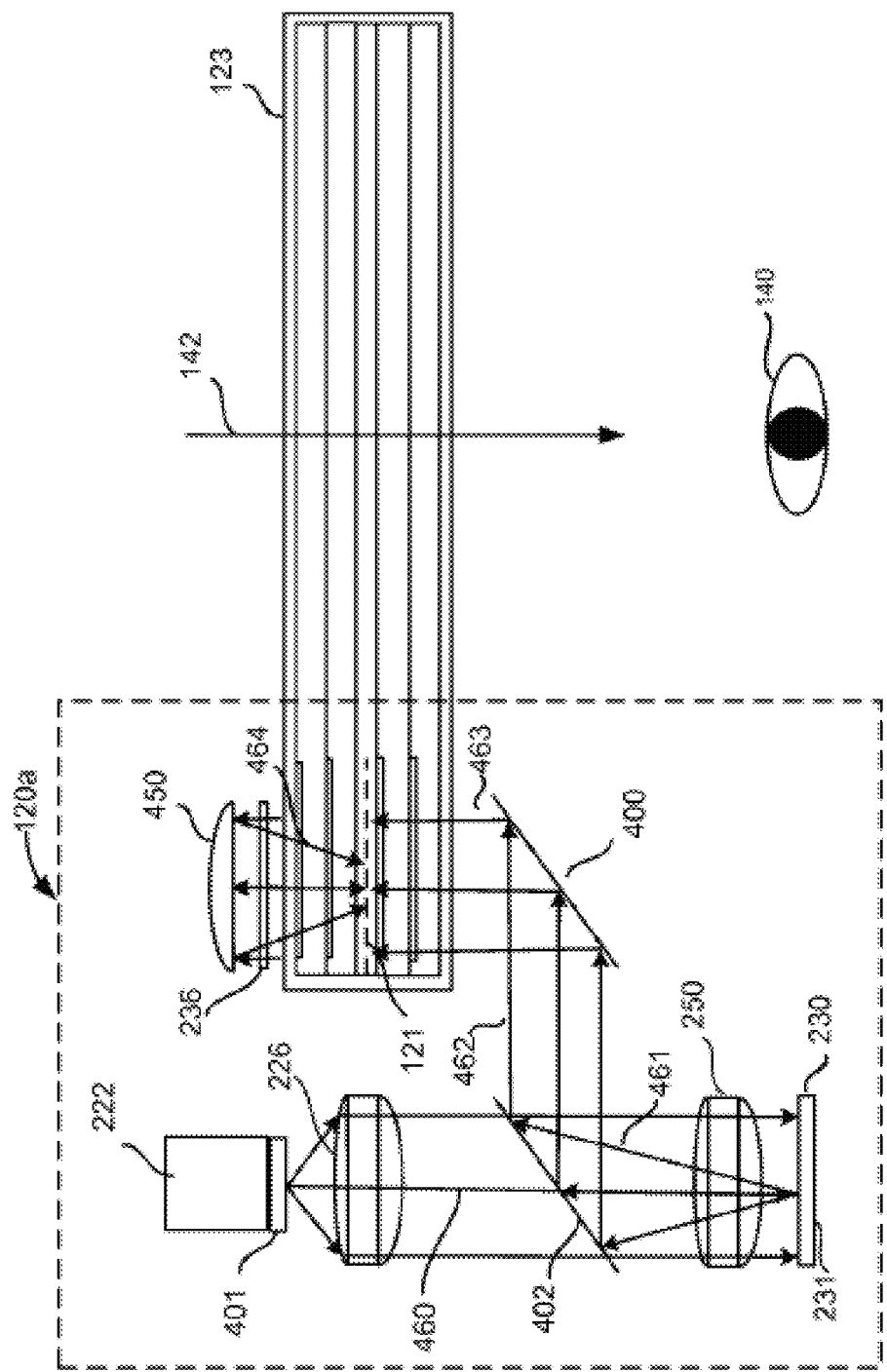
FIG. 9 is a yet further prior art see-through near-eye display system.
Figure 10:
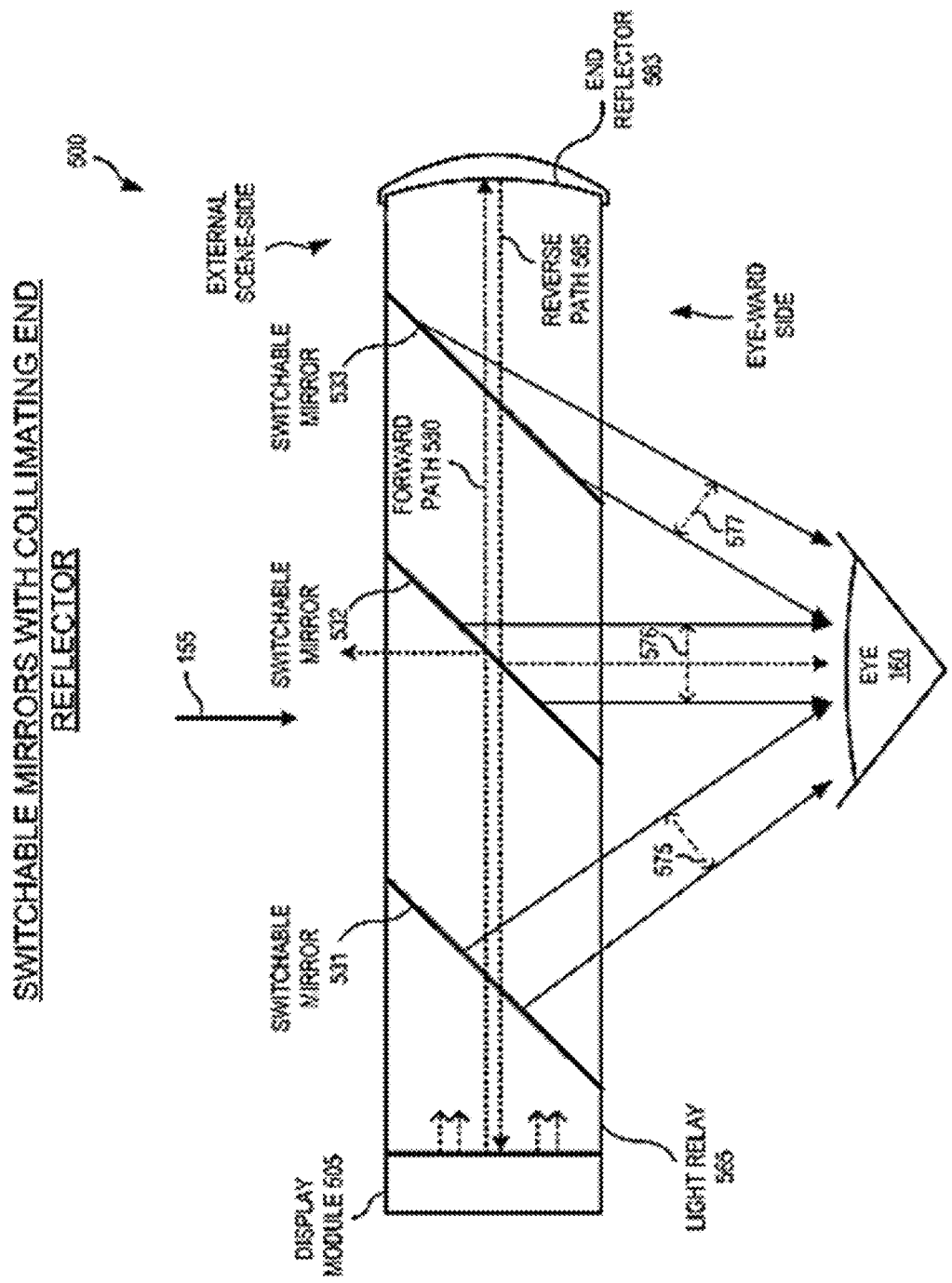
FIG. 10 is a yet further prior art see-through near-eye display system.

References in the following detailed description of the present invention to "one embodiment" or "an embodiment" mean that a particular feature, structure or characteristic described in connection with the embodiment is included in at least one embodiment of the invention. The appearances of the phrase "in one embodiment" in various places in the detailed description are not necessarily all referring to the same embodiment.

The present invention comprises a compact OST AR near eye display system that resembles the appearance of a pair of ordinary consumer eyewear or spectacle glasses, has good quality in both the displayed virtual image and the see-through real-world view, is easy to fabricate in mass production and is comfortable to wear by accommodating large inter-pupil distance (IPD) variation.

The present invention takes advantage of advances made in electronic display panel technologies, particularly the self-emissive type of display panels comprising micro-pixels as are disclosed in U.S. Patent Application Pub. No. 2014/0232651 and U.S. Pat. Nos. 7,623,560, 7,767,479, 7,829,902, 8,049,231, 8,243,770, 8,567,960, as examples. Other examples include organic LED (OLED) or the emerging micro-LED (MLED) displays. Display panels such as the above-referenced QPI display device offer high brightness and a high resolution image in a very compact format and are an enabling technology behind the compact near-eye display of present invention.

The present invention takes advantage of the ergonomic fact that, although interpupillary distance or "IPD" varies greatly among the general population, users are able to easily scan their eyes horizontally to the left or right and a user's eyes' vertical movement tends to be much narrower and less frequent. In other words, people generally can look up or down by tilting their heads up or down rather than by scanning their eyes up and down.

The disclosed near eye display system takes advantage of this human behavior and does not implement a circular eye box but instead provides an elongated eye box with a horizontal dimension that is larger than the vertical dimension. The vertical dimension of the eye-box of the disclosed near eye display system is large enough to accommodate typical viewers and can be vertically aligned with any user's eyes by simply adjusting or sliding the near eye display system along the bridge of the nose to accommodate viewers that are outside of the nominal range. Much contribution to near-eye display system bulkiness in the prior art stems from the requirement of a large eye box whereas this reduction of the size of the eye box in the vertical direction greatly minimizes the system's bulkiness in the corresponding direction which can be the vision line direction by choice.

A typical eyeglass optical lens is known to generally have its largest dimension along the horizontal direction and its smallest dimension along the vision line with the vertical dimension of the lens falling in-between the two. The shapes of the front (scene-facing) lens surface and the rear (pupil-facing) lens surface are generally decided by ophthalmic function or fashion with or without vision correction. On the other hand, the lateral or side surfaces, or peripheral edges of the lens can be modified to implement the function of input imaging from one or more display panels.

By disposing a display panel or panels on the peripheral surfaces, i.e., the upper, lower lateral surfaces, of a lens and then imaging the display panel output using engineered optical surfaces at such edge or edges, the larger horizontal lens dimension can be made to correspond to the larger horizontal eye box dimension and the smaller vertical lens dimension can be made to correspond to the smaller vertical eye box dimension. An acceptable vertical dimension of a comfortable optical lens is about 30 mm and matches very well to the magnification (focal length) of an exemplary near eye display system. In this manner, the form factor of a conventional optical lens is beneficially exploited to enable the present invention.

The present invention keeps the light path from the imaging display panel to the eye pupil as simple as possible. The invention employs rotationally symmetric optical surfaces and constrains the chief ray of the virtual image center to run along the optical axis of each powered optical surface and the display panel. Thus, although the ray path from the display panel to the eye pupil is folded multiple times to reduce the volume of the near-eye display system, no optical tilt is introduced into the system, resulting in excellent optical performance and low fabrication cost. Except for a transmission and a reflection at the embedded beam splitting plane, the remaining ray-surface interactions are limited to a low-loss transmission at the upper lens edge, a limited number of TIR reflections at the front and rear lens surfaces, a low-loss mirror reflection at the lower lens edge and a low loss transmission at the rear lens surface.

Although there are a number of ray-surface interactions, the total near eye display system optical losses remain low. The upper edge refractive optical surface and the lower edge reflective optical surface are designed with well-balanced aberrations to permit good optical performance with low system F/# and with a large field of view. As a result, the near eye display system of the invention has a large horizontal eye box and high optical efficiency. The TIR reflections off of the front and rear lens surfaces reduce the tilt of the embedded beam splitting plane and the ray incident angle at the surfaces. As a result, the vertical dimension of the eye box is kept comfortable while the thickness of the lens is minimized to reduce the overall bulkiness of the system.

One embodiment of the present invention expands the horizontal FOV of the disclosed near-eye display system by horizontally tiling multiple display panels along a horizontal edge or lateral surface of the lens. The resultant large horizontal eye box dimension and strong optical performance over a large FOV of the disclosed near eye display system ensures good optical performance over the expanded horizontal FOV.

Another embodiment of the present invention expands the vertical FOV of the disclosed near-eye display system using multiple switchable mirror elements embedded within the lens. Electric signals are used to switch the mirror elements between a complete transmission state (off-state) and a partially-optically transmissive-reflective state (on-state). Each display frame time period is divided into a number of sub-periods when only one of the switchable mirror elements is in an on-state. The multiple switchable mirrors are tilted relative to each other to ensure the desired FOV overlap and the alignment of its respective eye box with the eye pupil.

A yet further embodiment of the invention implements the above switchable mirror elements using polymer dispersed liquid crystal (PDLC) film interlayered Bragg mirrors. A PDLC film layer can be made to be optically "hidden" (i.e., index matched) or visible (i.e., index unmatched) depending upon the electric field applied. When the PDLC film layers are optically hidden, the switchable mirror element has very high optical transmission. When PDLC film layers are optically visible, they define a zero order Bragg mirror which has a flat reflectance over a predetermined wavelength band.

Typically, a Bragg mirror is designed to have as high a reflectance as possible which limits its working wavelength band. In the instant invention, the reflectance of the Bragg mirror can be lower, e.g., from 10% to 30%. As a result, the working wavelength band of the Bragg mirror can be much wider, making it possible to use a single PDLC film layer to cover the entire visible light spectrum. Preferably the working wavelength band of the Bragg mirror is wider than the wavelength band of the associated near eye display system so that its reflectance does not significantly change if the incident angle is different from the designed value. This ensures the switchable mirror elements have acceptable performance over the respective sub-FOVs associated with each.

Thus far, the description of the near-eye display system has been made with regard to a single eye channel. The same description can be made for the other eye channel which together provides stereoscopic or binocular vision. Further, the terms "lower" and "upper" are used for illustration only and it is understood that such terms may be used interchangeably.

In the following description, for the purpose of explanation, numerous specific details are set forth in order to provide a thorough understanding of the invention. It will be apparent, however, to one skilled in the art that the invention can be practiced with different specific details. In other instances, structures and devices may be shown in block diagram form in order to avoid obscuring the invention. It should also be clear to one skilled in the art that the features described herein can be used not only in the combinations as shown in described embodiment but also in other combinations or separately without departing from the scope of the present invention.

The disclosed near eye display system preferably uses one or more emissive micropixel display panels embedded within a frame structure of a common set of consumer eyewear glasses whereby the micropixel display panel is an optoelectronic semiconductor device that comprises an array of independently addressable, full-color emissive micropixels and electronic circuitry configured to drive the emissive micropixel array; all fully integrated into a single semiconductor chip or package that is sufficiently volumetrically small to be embedded efficiently within the eyewear frame preferably within the rim of the frame.

It is expressly noted the invention is not limited to the use of the aforementioned QPI emissive micropixel display panel and that any manner of electronic display element such as an OLED or similar micro-LED display element having suitable electrical and optical characteristics may be used and remain within the spirit and scope of any claims for the disclosed invention.

Figure 11:
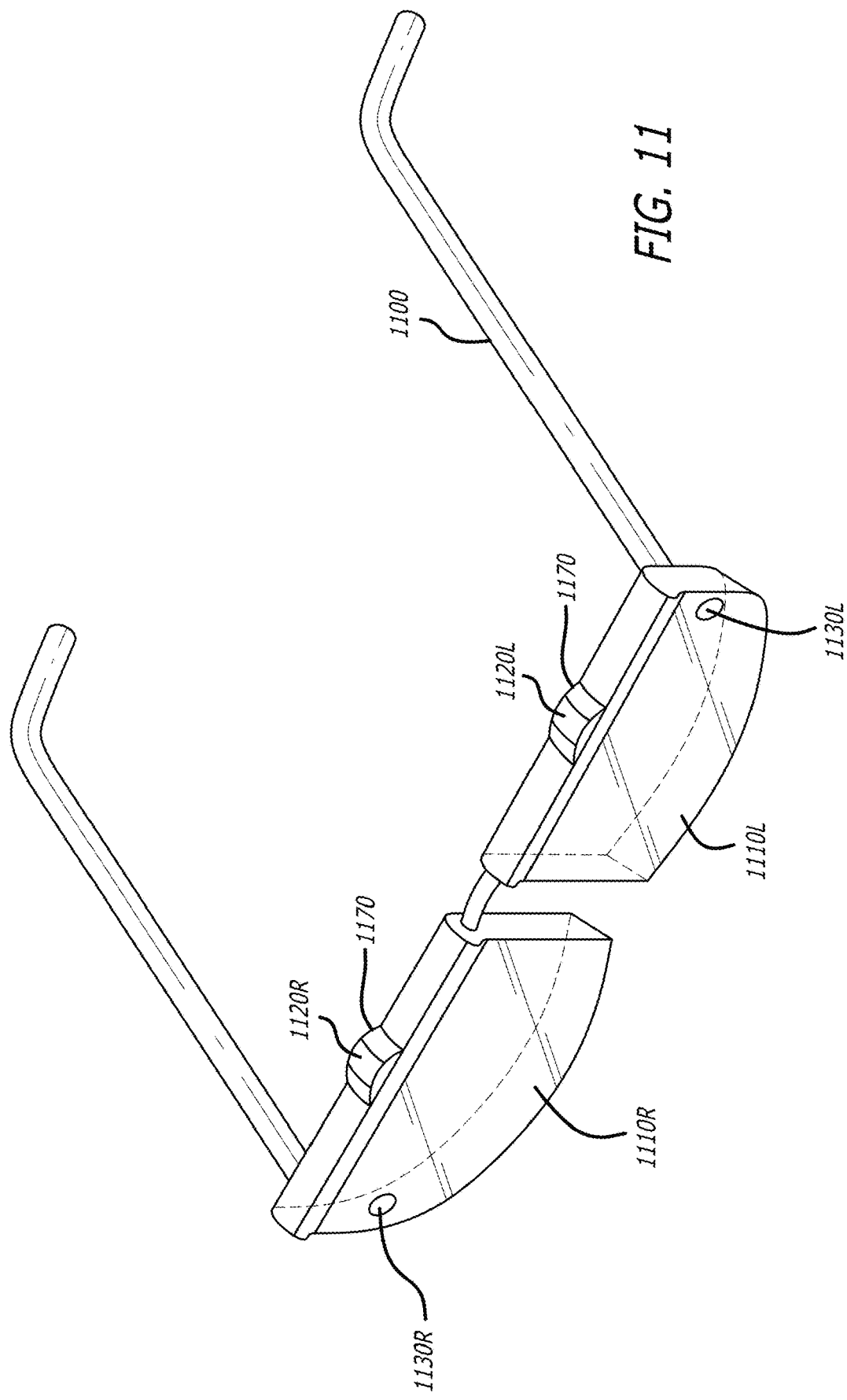
FIG. 11 illustrates a preferred embodiment of a near eye display system of the present invention.

FIG. 11 shows a preferred embodiment of the near eye display system 1 of the present invention. Frame 1100 comprises a pair of optical lens elements in the form of prism assemblies 1110R and 1110L, one for the right eye and left eye respectively, each of which are supported by frame 1100. In the illustrated embodiment, frame 1100 is designed to resemble an ordinary eyeglass frame assembly but other form factors are within the scope of the invention.

Electronic display panels 1120R and 1120L such as the above-referenced QPI display devices are preferably disposed at the upper edge or upper lateral surface of prism assemblies 1110R and 1110L in FIG. 11. Prism assemblies 1110R and 1110L resemble and function in the transmission of light from the real-world view as a pair of ophthalmic lenses which lenses may include vision correction. Other components such as processors, sensors such as front viewing cameras 1130R and 1130L, antenna, control circuit boards and batteries may also incorporated into frame 1100. Alternatively, display panels 1120L and 1120R may be connected to an external computer or processor through cables coming out of the two ends of the temple elements or wirelessly.

Figure 12:
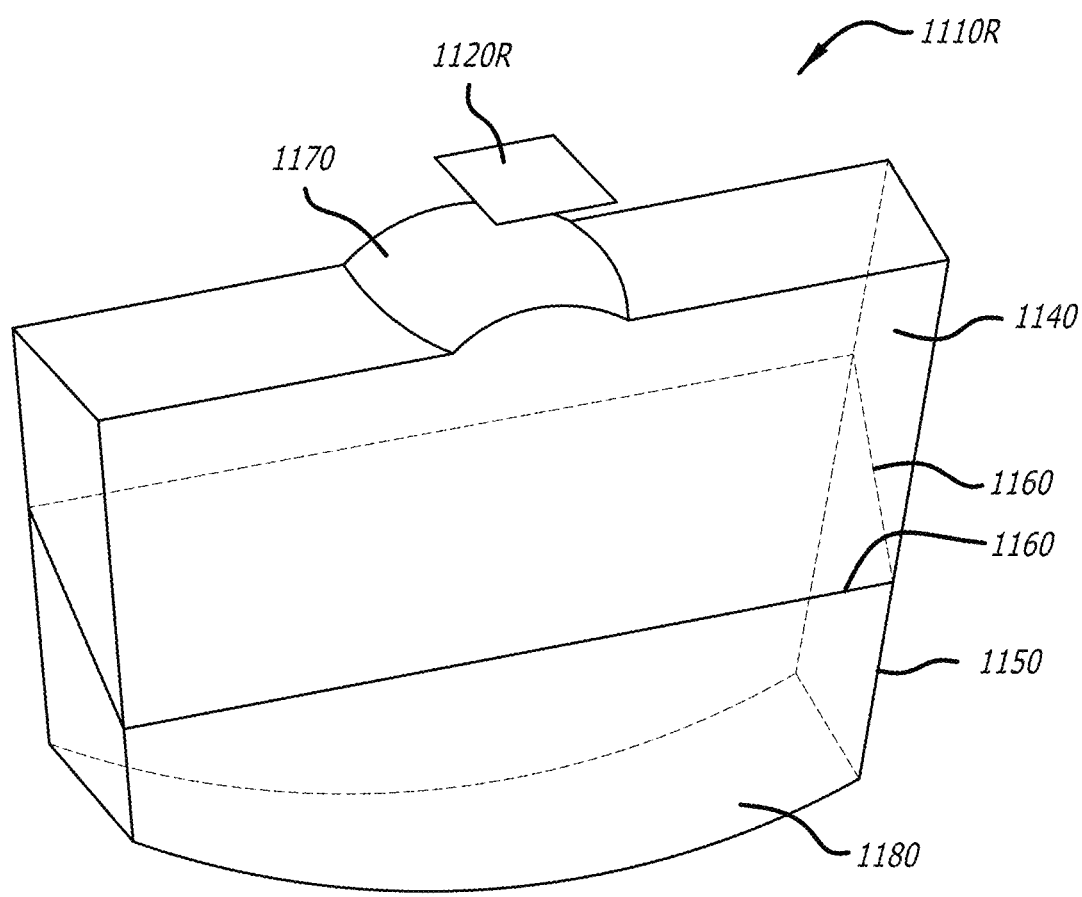
FIG. 12 is an illustration of a right eye channel of a near eye display system of the present invention.

For purposes of brevity and because of the symmetry between the lens systems of the invention for the left eye and the right eye, only the right eye system is described in the following description. FIG. 12 illustrates in greater detail prism assembly 1110R of FIG. 11. Prism assembly 1110R is comprised of a first element 1140 and a second element 1150 with a beam splitting interface 1160 as the bonding interface for the respective first and second elements. First element 1140 comprises an optical region 1170 comprising a predetermined optical power. A QPI or similar display panel 1120R is disposed on the side edge surface of first element 1140 of prism assembly 1110R and is optically coupled to optical region 1170.

Optical region 1170 comprises a lensing surface near display panel 1120R such as a QPI display device and is provided with a positive optical power. Provided functions of optical region 1170 may include: 1) increasing the magnification of the optical system beyond that of lower optically reflective surface 1180; 2) balancing the Petzval field curvature of lower optically reflective surface 1180 for better image quality over a larger field; and; 3) to control the display panel 1120R light emission direction to reduce image brightness roll off.

The peripheral edge of second element 1150 comprises an optically reflective surface 1180 also comprising a predetermined optical power. A beam splitting surface is disposed at interface 1160 where the respective surfaces of the first and second elements 1140 and 1150 are bonded. First element 1140 and second element 1150 are aligned and bonded together to define beam-splitting interface 1160 using an optical index matching cement. For the transmission of light from the outside scene, prism assembly 1110R functions like a parallel plate which introduces no optical aberration. For aesthetic reasons, the contour of prism assembly 1110R may be modified by curving the upper and side straight edges to resemble those often found in ordinary eyeglass lenses.

FIG. 13 shows the folded center ray path from the center of display panel 1120R, through prism assembly 1110R to the eye box center. The ray enters prism assembly 1110R by a transmission from display panel 1120R at the upper edge surface of first element 1140. The ray is then TIR reflected on rear surface RS the first time toward front surface FS. At front surface FS, the ray is TIR reflected the first time toward beam splitting interface 1160 which comprises a beam splitting coating. A portion of the ray energy (information ray) transmits to continue the light information path. The information ray is TIR reflected the second time at rear surface RS. Front surface FS then TIR reflects the ray a second time toward the lower optically reflective surface 1180. Upon reflection at lower optically reflective surface 1180, the ray reverses its direction and travels along the incoming path. After a third TIR reflection at the front surface FS and rear surface RS, the ray encounters beam splitting interface 1160 a second time. A portion of the ray energy is then reflected at beam splitting interface 1160 to continue the information path. Upon transmission through rear surface RS, the information ray reaches the eye box center.

Although the information path from display panel 1120R toward the eye box is folded a number of times to reduce optics volume, the optically powered surfaces of optical region 1170 and lower optically reflective surface 1180 are not tilted from the perspective of the described center ray. As a result, near eye display system's 1 optical performance can be very high by employing rotationally symmetrical surfaces at 1170 and 1180. This brings the advantage of low cost fabrication. As can be seen from the above ray path description, near eye display system 1 has high optical throughput efficiency due to the employment of TIR reflections. A limitation for the throughput efficiency can be the beam splitting coating at beam splitting interface 1160. Assuming a 30% reflection and a 70% transmission at the beam splitting coating, the throughput efficiency of the beam splitting interface 1160 is about 21%. The complete system 1 throughput efficiency is further reduced by reflection losses during transmission into and out of prism assembly 1110R and the absorption at lower optically reflective surface 1180. Assuming a 1% reflection loss and a 92% mirror reflection efficiency, the complete system throughput of display panel 1120R is about 19%. This system efficiency is desirably increased when a polarization beam splitter is used as described in the following embodiment.

FIG. 14 shows the optical path in an embodiment of near eye display system 1 comprising a polarized beam splitting coating (PBS) at polarized beam splitting interface 1160P. In the enlarged callout circle, the PBS layer is labeled as B. The label A represents the portion of prism assembly 1110R on which the PBS coating is disposed. The label C represents a phase retarder layer which is disposed on the opposing portion of prism assembly 1110R identified as D. The PBS coating passes the "p" polarization state of light while reflecting the "s" polarization state.

A polarizer film is provided and configured with respect to display panel 1120R to pass only the p polarization state of light from display panel 1120R. After two TIR bounces, the information ray transmits through PBS layer A. Due to the p polarization state of the information light, there is no reflection at the PBS layer which, in an embodiment described in the prior art, undesirably causes the outward leakage of information light.

The phase retarder layer following the PBS layer has its fast axis oriented at a suitably chosen angle alpha ($\alpha$) relative to the p polarization direction. The amount of phase retardation lambda ($\lambda$) of the retarder layer is also chosen suitably. The criteria of setting ($\alpha$) and ($\lambda$) are such that the polarization of light is in s polarization state when it is reversed by the lower optically reflective surface 1180 and subsequently incident on the PBS layer the second time. The information light is then reflected by the PBS layer toward the eye box. It can be seen from the above description that not only the outward information leakage is avoided in this embodiment but also the system throughput efficiency is significantly higher (e.g., about 50% instead of the 21% of the neutral beam splitter case).

Alternatively the previous embodiment can be realized using the polarized emission QPI device as display panel 1120R described in the above references in which case an added efficiency is realized because the majority (nearly 100%) of the optical power emitted by a polarized emission QPI display panel 1120R is concentrated in the p polarization state. Beneficially, in this embodiment, by using the polarized emission QPI display panel 1120R not only is outward information leakage avoided but also the near eye display system 1 throughput efficiency reaches nearly 100% instead of the 50% and the 21% of the previous two embodiments; respectively.

FIG. 14 shows the eye box region (the thatched area) of the right eye prism assembly 1110R for near eye display system 1 according to an embodiment of the invention. The horizontal dimension of the eye box is several times larger than its vertical dimension. This is the result of the horizontal dimension of the prism assembly 1120R in FIGS. 11-13 being much larger than its dimension along the vision line direction. Desirably, this does not cause an issue in performance. Although the large horizontal eye box dimension is needed to accommodate the variation of IPD found among the user population and the left and right sweeping of eye pupil, the smaller vertical eye box dimension is easily compensated for by adjusting the position of the eyeglass frame on a user's nose bridge. This effect is further minimized by the fact people naturally tend to tilt back their head to look up instead of rolling their eyes upward.

Earlier attempts have been made to provide the vertical dimension of eye box as large as the horizontal dimension. The resulting systems have tended to be bulky, less optically efficient and/or complicated. On the other hand, the near eye display system 1 of the present invention beneficially combines the large horizontal width dimension of an eyeglass lens with the needed large horizontal dimension of the near eye display system 1 eye box and the smaller thickness dimension with the acceptably smaller vertical dimension of the eye box. The display pixel pitch and the required magnification for a comfortable near eye display system generally dictates a suitable effective focal length of the optics of the disclosed system being in the range from 15 mm to 25 mm.

Figure 15:
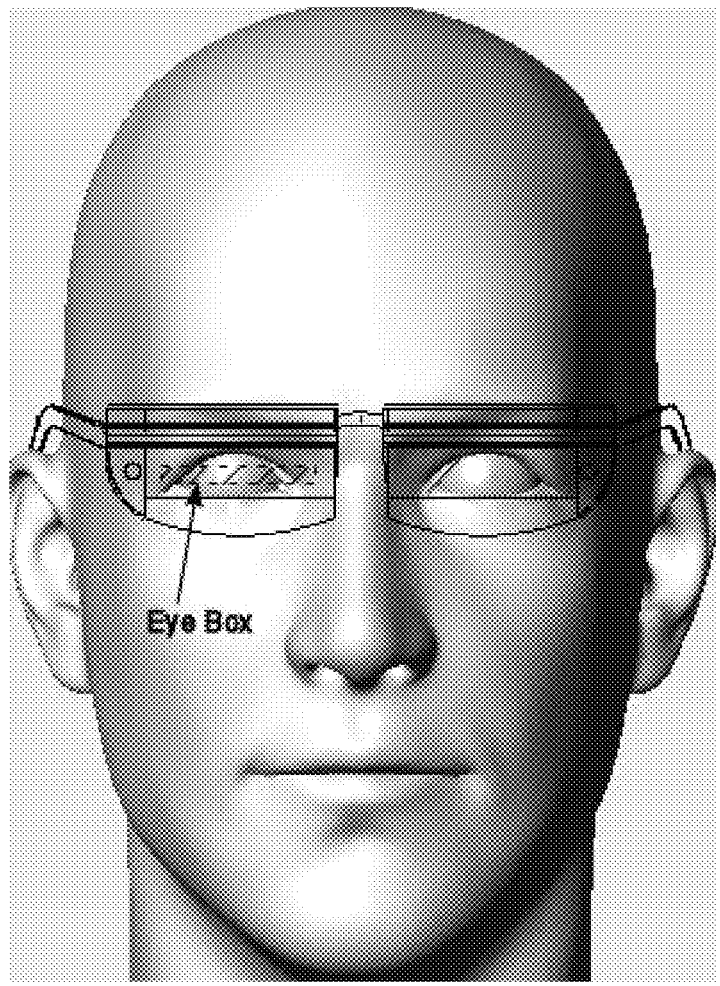
FIG. 15 shows the rectangular eye box of a near eye display system of the present invention.
Figure 16:
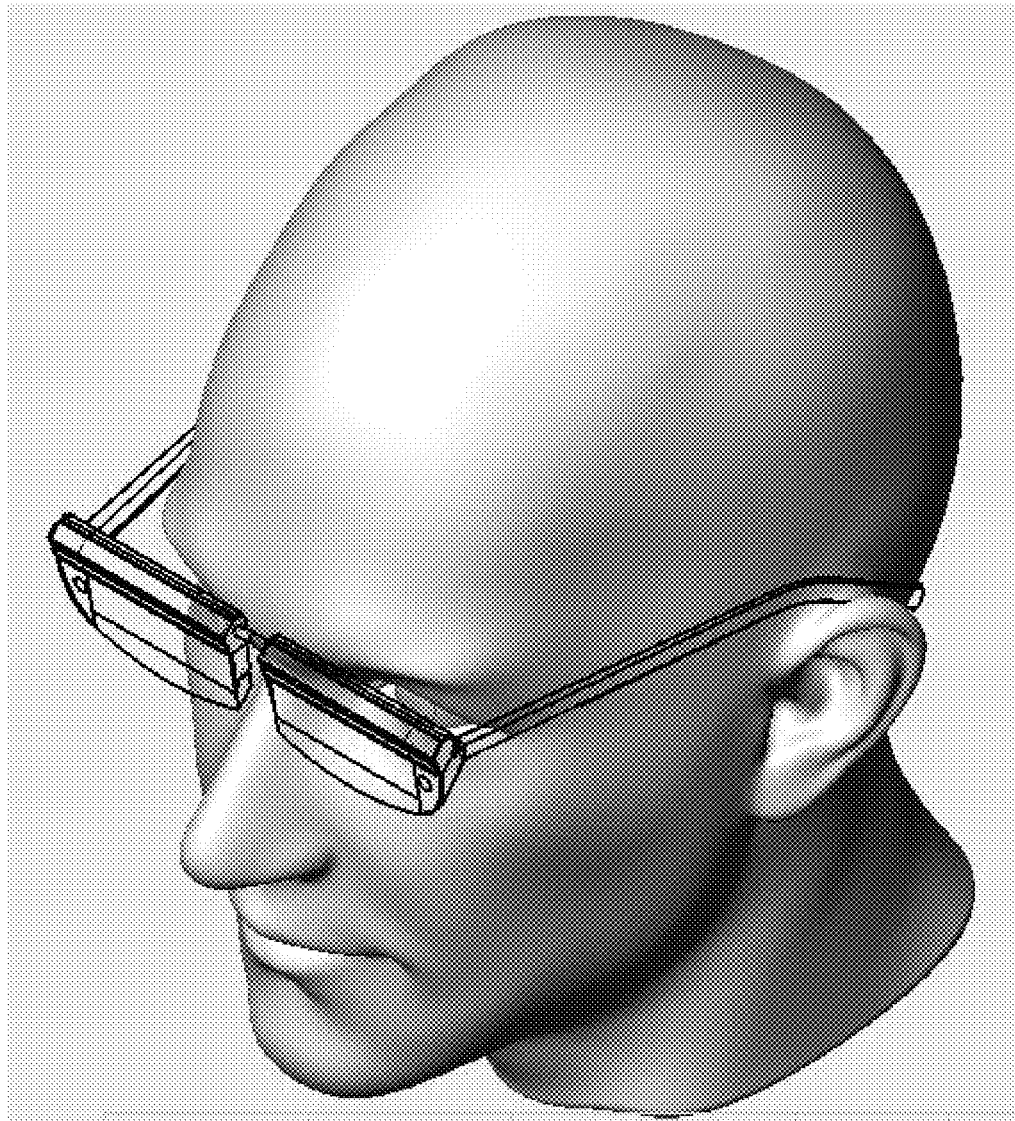
FIG. 16 shows the near eye display system of the present invention on a user.

By embedding a large segment of the ray path from display panel 1120R to the optically reflective surface 1180 within a medium with an optical index greater than 1, the physical dimension from display panel 1120R to the optically reflective surface 1180 is increased for a better match between the height dimension of an eyeglass lens and that of prism assembly 1110R of the near eye display system 1. Further, the absence of tilt of the lower optically reflective surface 1180 and the upper optical region 1170 (which may be in the form of a refractive surface) relative to the chief ray of the near eye display system 1 means the optical aberration is well-behaved and can be controlled with simple surfaces of rotational symmetry. All of these features provide a high performance, easy to manufacture near eye display system 1 as depicted in FIGS. 15 and 16.

Figure 17:
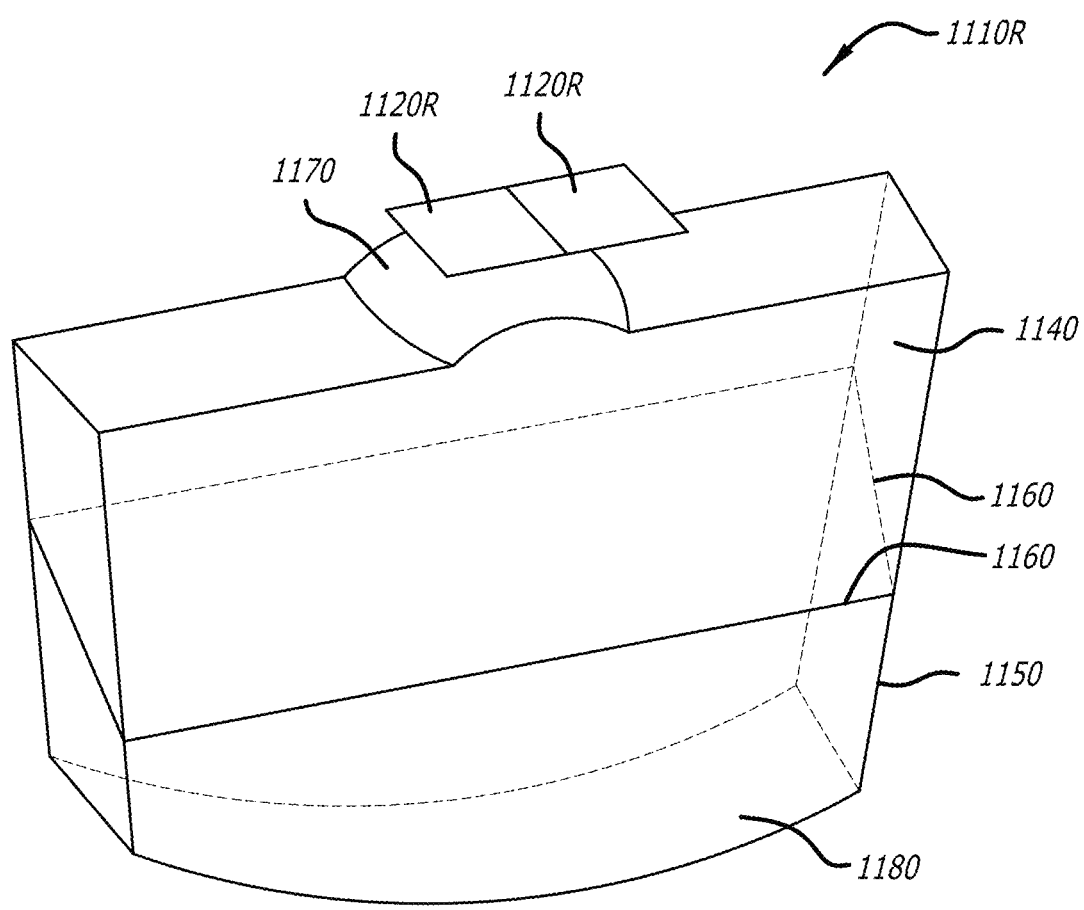
FIG. 17 shows an embodiment for the expansion of the horizontal field of view of the near eye display system of the invention.

For a near eye display system 1 where a larger horizontal FOV is desirable, more than one display panel 1120R can be tiled closely along the horizontal direction of a lateral surface or side of prism assembly 1110R. FIG. 17 illustrates an embodiment comprising two QPI display panels 1120R. There are a number of features in the present invention that facilitate such horizontal tiling. First, the large horizontal dimension of prism assembly 1110R easily accommodates multiple display panels 1120R. Second, the QPI display panel technology enables minimum or negligible-gap tiling between display panels. Thirdly, the large horizontal eye box and high optical performance of the prism assembly 1110R ensures the system can cover the increased FOV without perceived image degradation to the human visual system (HVS).

For a near eye display system where a larger vertical FOV is desirable, a vertically-multiplexed field of view near eye display system 1 is described. The advantage of such a device is that it maintains the compactness of the system although at some expense to system optical efficiency. A QPI display panel is very bright, achieves high modulation rates and can compensate for any drop of optical efficiency due to time-sharing.

Figure 18:
FIG. 18 shows an embodiment for the expansion of the vertical field of view of the near eye display system of the invention.
Figure 18:
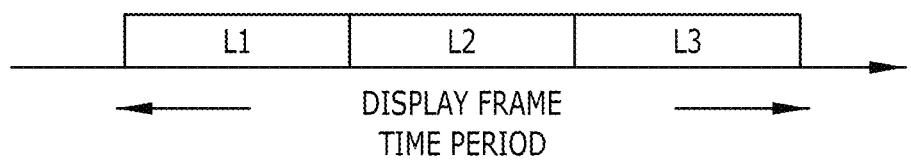

FIG. 18 shows a vertically-multiplexed field of view near eye display system 1 wherein the total FOV is built up by use of sub-FOVs. Each sub-FOV is displayed over a portion of a frame period. The temporal duration of each sub-FOV can be content-controlled or viewer-gaze controlled.

FIG. 18 illustrates an embodiment of a vertically-multiplexed field of view near eye display system 1, comprising, in the non-limiting illustration, three sub-FOVs. Each sub-FOV is generated by a prism assembly 1110R as described earlier in this disclosure. Specifically, information light from display panel 1120R first pre-conditioned by an optical element or film such as a polarizer to generate a suitable polarization state and/or pixel level micro-optics for subsequent angular tailoring. Such pre-conditioning is performed to increase the contrast of the switchable reflecting layers described in the following but may be omitted in desired embodiments. The information light then enters prism assembly 1120R through optical region 1170 which may be provided with optical power. The information light then travels down the prism assembly 1120R by TIR reflections between the front surface FS and back surface RS.

Figure 19:
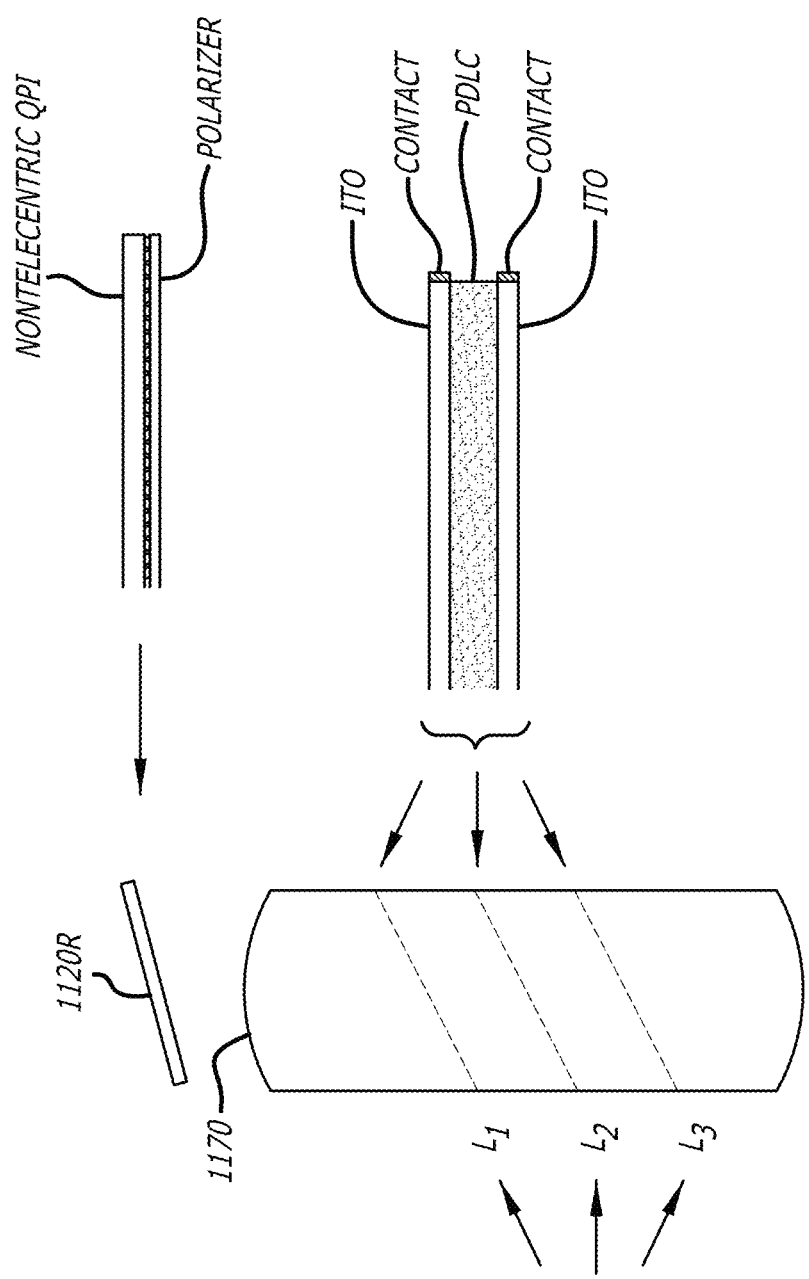
FIG. 19 shows an embodiment of the near eye display system of the invention comprising switchable mirror elements.

FIG. 19 depicts a lens cross-sectional view showing optical elements and electrically activated semi-reflector layers L1, L2 and L3 (individually referred to as "layer" herein). In the non-limiting embodiment of FIG. 19, three switchable semi-reflecting layers L1, L2 and L3 are embedded within prism assembly 1120R with one for each sub-FOV. More than three semi-reflective layers are contemplated as falling within the scope of the invention. The respective semi-reflecting layers are turned on only during the period when their associated sub-FOV is displayed. When the particular semi-reflecting layer is turned off, it is optically hidden from the information light through index-matching to the background material comprising prism assembly 1120R. The information light transmits at its corresponding semi-reflective layer the first time and continues its TIR-folded path toward optically reflective surface 1180. After reversing its direction at optically reflective surface 1180, the information light travels back to its corresponding semi-reflecting layer. The information light is then reflected by the semi-reflecting layer to exit the prism assembly 1120R through the rear surface RS and into the eye box. Due to the vertical displacement between one switchable semi-reflective layer and another, a small horizontal tilt angle is formed between them to overlap their associated eye boxes.

A mechanism to realize the switchable semi-reflective layer of FIG. 19 may comprise sandwiching a diffractive optical element- or "DOE"-reflector PDLC structure between a pair of transparent conductor layers (indium tin oxide or "ITO" layers, for example) as shown in FIG. 19. Due to the small size of the liquid crystal (LC) droplets suspended in the polymer background of the PDLC layer, the layer can be switched very fast by an appropriately designed voltage signal waveform. When a voltage signal is applied, the electric field aligns the optical axis of each LC droplet whose effective index differs from its surrounding polymer in which it is suspended to cause the PDLC DOE structure (which may be lithographically imprinted on the PDLC structure) to become optically hidden and the layer to become completely invisible.

When no voltage signal is applied to the layer, the randomly oriented LC droplets have an effective index that is different from its surrounding polymer and the revealed DOE-reflector causes a phase perturbation to the incident wave front. The resulting scattered wave amplitude is proportional to the PDLC density which can be appropriately tuned to a desired reflection direction and transmission ratio through an appropriate selection of the DOE-reflector. A preferred DOE structure of PDLC is to stack up multiple PDLC layers interspersed by polymer layers to define a Bragg mirror structure. Such a Bragg mirror can achieve acceptable reflection with a minimum density or thickness of the single PDLC layer and hence reduce the magnitude of the required switching voltage. Further, the Bragg mirror can sustain a flatter optical response performance over a larger wavelength band and/or incident angles. The fact the incident angle at a switchable reflective mirror in such a system is reduced by TIR bouncing off the side faces further facilitates its implementation.

As described earlier, the FOV temporal multiplexing method and device described in the above embodiment can be realized by dividing the image display frame period into sub-periods, with each such sub-period being dedicated to the display of one of the multiplexed FOV segments. By taking advantage of matching the HVS acuity across the FOV, a longer temporal multiplying period as well as higher brightness and wider color gamut can be used for displaying the FOV segment containing the optical axis (i.e., along the viewer's gaze axis) than for the FOV segments addressing the peripheral regions of the HVS. With this approach, the near eye display system 1 efficiently utilizes its resources in terms of brightness, power, resolution and color gamut coverage, to more closely match the acuity of the viewer's HVS. Thus, in addition to achieving a wider horizontal and vertical FOV, the near eye display system 1 resources are efficiently utilized proportionally with the viewer's HVS perceptional capabilities.

It is noted that a wider horizontal FOV may be addressed by the invention by using multiple display panels 1120R such as QPIs and a wider vertical FOV may be addressed by the switchable semi-reflecting layer or mirror. It is also possible to alternately make the function of the switchable semi-reflecting layer or mirror be performed using a switchable diffractive optical element (DOE) that is nano-imprinted on the exterior surfaces of a waveguide optical element rather than being interposed within its interior.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A near eye display system, comprising:
   at least one optical lens element comprising:
      a first optical element;
      a second optical element; and
      a beam splitting interface between the first and second optical elements; and
   an emissive display device disposed at an edge or a lateral surface of the first optical element;
   wherein the emissive display device transmits light from the edge or lateral surface of the first optical element;
   wherein the light is transmitted on a ray path, from the emissive display device to an eye box of a viewer, that is folded a plurality of times, such that the transmitted light is reflected on a rear surface and a front surface of the first optical element, reflected on a rear surface and a front surface of the second optical element, and reflected by the beam splitting interface.

2. The system of claim 1, wherein the edge or lateral surface of the first optical element is an upper edge or upper lateral surface of the first optical element.

3. The system of claim 1, wherein the beam splitting interface is a bonding interface of the first and second optical elements.

4. The system of claim 1, wherein the first optical element comprises an optical region optically coupled to the emissive display device, and the optical region comprises a predetermined optical power.

5. The system of claim 4, wherein the optical region comprises a lensing surface near the emissive display device.

6. The system of claim 4, wherein the optical region comprises a rotationally symmetrical surface.

7. The system of claim 1, wherein the second optical element comprises an optically reflective surface having a predetermined optical power.

8. The system of claim 7, wherein the optically reflective surface comprises a rotationally symmetrical surface.

9. The system of claim 1, wherein the first and second optical elements are aligned and bonded together to define the beam splitting interface using an optical index matching cement.

10. The system of claim 1, wherein the transmitted light reflected on the rear surface and on the front surface of the first optical element is reflected on the rear surface toward the front surface of the first optical element, and is then reflected on the front surface toward the beam splitting interface which partially reflects the light to the second optical element.

11. The system of claim 10, wherein the transmitted light is further reflected on the rear surface of the second optical element toward the front surface of the second optical element which reflects the transmitted light toward an optically reflective surface of the second optical element.

12. The system of claim 11, wherein the optically reflective surface of the second optical element further reflects the transmitted light toward the front surface of the second optical element, the front surface of the second optical element reflects the transmitted light toward the rear surface of the second optical element, and the rear surface of the second optical element reflects the transmitted light toward the beam splitting interface which again partially reflects the transmitted light to the first optical element.

13. The system of claim 12, wherein the front surface of the first optical element receives the portion of transmitted light reflected from the beam splitting interface and reflects the portion of the transmitted light through the rear surface of the first optical element to the eye box of the viewer.

14. The system of claim 1, wherein the beam splitting interface comprises a polarized beam splitting (PBS) coating.

15. The system of claim 14, wherein the PBS coating is disposed on a phase retarder layer, the PBS coating and phase retarder layer both being disposed between opposing portions of the optical lens element.

16. The system of claim 15, wherein the phase retarder layer has a fast axis oriented at a selected angle relative to a p polarization direction.

17. The system of claim 16, wherein the angle relative to the p polarization direction and an amount of phase retardation are selected such that the polarization of light is in an s polarization state when a portion of the light is reversed by an optically reflective surface of the second optical element and subsequently incident on the PBS coating.

18. The system of claim 14, wherein the PBS coating is configured to pass a p polarization state of light while reflecting an s polarization state of light.

19. The system of claim 1, wherein a horizontal dimension of the eye box is larger than a vertical dimension of the eye box.

20. The system of claim 1, wherein the emissive display device is tiled with another emissive display device along a direction of the edge or the lateral surface of the first optical element to produce a total field of view (FOV).

21. The system of claim 20, wherein the total FOV comprises a plurality of sub-FOVs, wherein each sub-FOV is displayed over a portion of a frame period.

* * * * *